May 3, 1960 F. A. PERRINO 2,934,876
ROTARY GRASS TRIMMER
Filed July 14, 1958
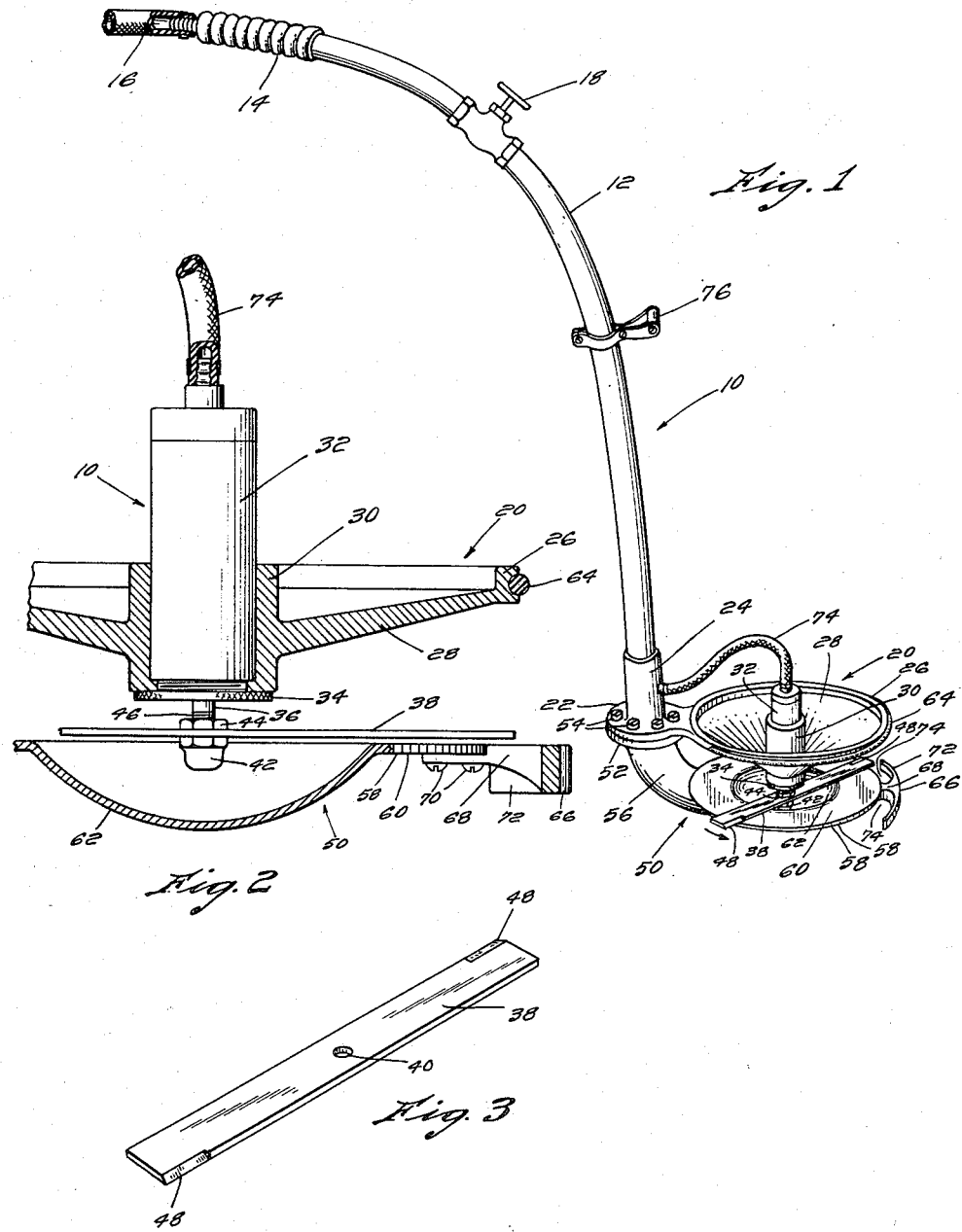
INVENTOR.
Frank A. Perrino
BY Elliot A. Salter
Attorney.

United States Patent Office 2,934,876
Patented May 3, 1960

2,934,876

ROTARY GRASS TRIMMER

Frank A. Perrino, North Providence, R.I., assignor of two-thirds to Reverend Joseph Francis McCabe, Providence, R.I.

Application July 14, 1958, Serial No. 748,460

1 Claim. (Cl. 56—25.4)

The present invention relates generally to grass trimming apparatus and is more particularly concerned with rotary grass trimmers of the type frequently used in cemeteries to trim the grass adjacent the monument stones and the like.

A primary object of the instant invention is the provision of a rotary grass trimmer which is of relatively light weight and hence is extremely maneuverable.

Another important object of this invention is the provision of a rotary grass trimmer which will effectively cut grass closely adjacent an upstanding abutment, and which has means for preventing the cutting blade from ever coming into contact with such an abutment.

Another object of my invention is the provision of a rotary grass trimmer which is relatively inexpensive to operate and less susceptible to damage.

A further object of this invention is the provision of a device of the character described which will trim grass far more effectively and in less time than devices of this type heretofore in use.

Still another object of my invention is the provision of a rotary grass trimmer which is relatively inexpensive to manufacture, easy to operate, and of durable construction.

Other objects, features and advantages of the invention will become apparent as the description thereof proceeds when considered in connection with the accompanying illustrative drawings.

In the drawings which illustrate the best mode presently contemplated by me for carrying out my invention:

Fig. 1 is a perspective view of a rotary grass trimmer constructed in accordance with the instant invention;

Fig. 2 is a fragmentary elevational view, with parts broken away and shown in section and on an enlarged scale, showing the lower portion of the instant apparatus; and Fig. 3 is a perspective detail, on an enlarged scale, of the cutting blade per se.

It has long been known that conventional lawn and grass cutting apparatus is incapable of effectively cutting grass adjacent upstanding abutments since the construction of apparatus of this type makes it impossible for the cutting blade to operate in close proximity to such an abutment. This is a problem of particular concern in cemeteries and the like where it is both desirable and necessary to effectively trim grass which is growing close to the base of an upstanding monument or stone. In order to overcome this problem, specially designed grass trimmers have heretofore been in use, but such devices, where power driven, have proven to be difficult to maneuver, expensive and inconvenient to operate, and generally undesirable.

Thus, for example, where grass trimming apparatus is powered by a gas engine, it has been found that the apparatus is entirely too cumbersome and unwieldy for effectively performing the delicate cutting operation which is desired. Likewise, where an electric motor is used as the power means, it has been found that the apparatus is prone to severe damage should the blade encounter an obstruction, since, in such an event, the motor is likely to burn out unless expensive and complicated slip clutch arrangements are utilized. In addition, the use of an electric motor requires the presence of a source of electrical power, which source is not always readily available when cutting in large outdoor areas, such as cemeteries or the like. Furthermore, it has been found that where an electric motor is used, electric shocks are frequently transmitted to the operator during use of the apparatus thereby causing great discomfort.

In order to overcome the above disadvantages, there is provided in accordance with the instant invention a rotary grass trimmer which is powered by an air motor. The use of an air motor as the power source results in the provision of a relatively light-weight and hence highly maneuverable device which is not only less expensive and easier to operate, but which also enables a more effective grass trimming operation to be performed. More specifically, it has been found that where an air motor is employed in a device of the character described, the cutting blade can actually be rotated faster than where an electric or gas motor source is employed, which results in the performance of a more effective cutting operation in a considerable lesser time. Thus, it has been found that speeds up to approximately 50,000 r.p.m. for the cutter blade can be achieved by means of an air motor resulting in more effective cutting in approximately one-half the time required for the same cutting operation where electric or gas trimmers are utilized.

Referring now to the drawings, there is shown generally at 10 a rotary grass trimmer constructed in accordance with my invention. The apparatus 10 comprises an elongated, substantially upright, tubular handle 12, preferably metallic, said handle being gently curved in the manner indicated. At its upper extremity the handle 12 is provided with an air inlet connection in the form of a flexible connector 14 which in turn is adapted to receive hose 16 whereby air under pressure may be introduced to the tubular handle 12 from any suitable source, not shown. A regulating valve 18 is provided in the handle adjacent its upper extremity whereby the flow of air under pressure through said handle may be interrupted or adjusted for reasons hereinafter to be made apparent.

At the lower extremity of handle 12 there is secured a circular mounting bracket generally designated at 20. As will be noted, the bracket 20 has a circular flange 22 from which extends a hub 24, the latter receiving the lower end of the handle 12 and being secured thereto by any suitable means. Bracket 20 further comprises a circular rim portion 26 and a central web 28 which depends downwardly and merges with a central housing 30, which functions as a mounting for air motor 32. Since air motor 32 is of conventional and standard construction, it is not thought that any detailed description thereof is necessary, although an example of an air motor that can effectively be used is the Aero Power Motor, 22 Series #7800, made by Aero Equipment Co. of Bryan, Ohio.

The lower end of central housing 30 threadedly receives a plug 34 which acts as a bearing for downwardly extending motor shaft 36, said shaft having fixedly secured thereto for rotation an enlongated cutting blade 38. It will be understood that blade 38 may be secured to shaft 36 by any desirable means, although I prefer to provide the said cutting blade with an aperture 40 for receiving shaft 36 and then clamping the blade to said shaft by means of clamp nuts 42, 44, it being obvious that the lower extremity of shaft 36 is threaded as at 46. As will be noted, blade 38 is provided with cutting edges 48, said cutting edges being located to be effective upon counter-clockwise rotation of the cutting blade, The apparatus 10 further comprises a base 50 having a circular flange 52 clamped to flange 22 by means of clamping bolts 54. Flange 52 is of imperforate construction whereby it acts as a stop against further air passage through handle 12.

Base 50 is further characterized by a downwardly curved extension 56 which joins flange 52 with a circular support 58 having a flat marginal portion 60 and a downwardly dished central portion 62. As will be noted, the circular support 58 is located beneath mounting bracket 20 and in axial alignment therewith. It will further be noted that cutting blade 38 is disposed slightly above the flat marginal portion 60, and the length of said cutting blade is slightly greater than the diameter of said flat marginal portion. Also, for reasons hereinafter to be made apparent, rim 26 of mounting bracket 20 is provided with a resilient bead 64 secured to said rim by any desirable means, said bead extending outwardly to a point slightly beyond the outer end of blade 38.

Extending outwardly from the flat marginal portion of mounting support 58 is a guide member 66. More specifically, guide 66 comprises an outwardly extending arm 68 secured to the under surface of marginal portion 60 as by screws 70, it being noted that the said arm is located substantially diametrically opposite to handle 12. Guide 66 further comprises an arcuate bar or strip 72, said bar extending in substantially parallel spaced relation with respect to the outer peripheral edge of portion 60 and being open at its opposite ends whereby to provide channels 74.

In order to direct the flow of pressurized air from handle 12 to motor 32, an air-flow conduit 74 is provided extending from said motor to hub 24. Also, to facilitate manipulation of the device 10, a hand grip 76 may be clamped to handle 12 in the manner illustrated.

In operation and use, the hose 16 is connected to a suitable air pump or other source of pressurized air (not shown), and the valve 18 is regulated to run motor 32 and hence blade 38 at the desired speed, it being obvious that the pressurized air flows through the handle 12 and conduit 74 to the said motor. The downwardly depending dished portion 62 of base 58 is the support upon which the apparatus 10 rests, it being understood that the device may be easily slid along the grass and tilted to accomplish trimming of the grass at the desired height. The guide 66 not only prevents blade 38 from striking an abutment, but it also functions to gather and bunch the grass within the channels 74 whereby blade 38 will effectively shear off the grass extending above the flat marginal portion 60. It has been found that the combination of guide 66 and the grass receiving and gathering channel 74 defined thereby, on the one hand, and the air motor driven cutter 38, on the other hand, results in a greatly improved grass trimming operation, as compared to the results accomplished by apparatus of this general type heretofore in use, which apparatus, as hereinbefore described, has primarily been driven by electric and gas motor means.

To further insure that blade 38, when being driven, does not engage a fixed abutment, the resilient bead 64 functions as a bumper, whereupon should the apparatus 10 be accidentally removed sidewise into engagement with a monument stone or the like, the said bumper will maintain blade 38 in spaced relation from the stone so engaged.

It is once again emphasized that the instant apparatus is a trimming device used for cutting or trimming grass adjacent upstanding abutments, such as monuments or stones in cemeteries and the like, and hence is not to be confused with the conventional grass cutter or mower. Thus, the high degree of maneuverability and the amazingly effective cutting action which result from the use of air motor 32 in combination with the other structure afore recited are factors of great importance in a trimming device of this type.

While there is shown and described herein certain specific structure embodying the invention, it will be manifest to those skilled in the art that various modifications and rearrangements of the parts may be made without departing from the spirit and scope of the underlying inventionive concept and that the same is not limited to the particular forms herein shown and described except in so far as indicated by the scope of the appended claim.

I claim:

A rotary grass tirimmer comprising an elongated, substantially rigid tubular handle, said handle extending substantially upright and having a gentle curvature, a circular base secured to said handle adjacent the lower end thereof, said base comprising a flat marginal portion and a dished, downwardly extending central portion, said central portion being adapted to engage the ground for supporting the apparatus when in use, a circular mounting bracket secured to and extending from said handle and positioned above said base in spaced concentric relation with respect thereto, an air motor secured to said bracket, an air inlet connection at the upper end of said handle, an air conduit extending from adjacent the lower end of said handle to said motor, an elongated cutter blade of greater length than the diameter of said base operatively connected to said air motor and adapted to be rotated thereby in a plane closely spaced from the plane of said base marginal portion, whereby grass adjacent and extending above the peripheral edge of said base is adapted to be sheared off when said blade is rotated, said mounting bracket being of slightly greater diameter than the length of said blade whereby said bracket edge acts as a bumper, and a guide member extending outwardly from the periphery of said base, said member having a curved bar portion extending in parallel spaced relation with respect to said base periphery whereby to provide a grass gathering and receiving channel.

References Cited in the file of this patent

UNITED STATES PATENTS

| 108,069 | Wagner | Oct. 4, 1870 |
| 1,814,649 | Wade | July 14, 1931 |
| 2,232,261 | Orr | Feb. 18, 1941 |
| 2,263,431 | White | Nov. 18, 1941 |
| 2,660,847 | Britten | Dec. 1, 1953 |

FOREIGN PATENTS

| 566,252 | Great Britain | Dec. 20, 1944 |